United States Patent [19]

Retzbach et al.

[11] Patent Number: 5,711,538
[45] Date of Patent: Jan. 27, 1998

[54] CHUCKING TOOL WITH AN EXPANSION SLEEVE

[75] Inventors: Thomas Retzbach, Bönnigheim; Gerhard Michler, Ilsfeld, both of Germany

[73] Assignee: Fritz Schunk GmbH Fabrik fur Spann-Und Greifwerkzeuge, Lauffen A.N., Germany

[21] Appl. No.: 702,251

[22] Filed: Aug. 23, 1996

[30] Foreign Application Priority Data

Aug. 24, 1995 [DE] Germany .................. 195 31 211.2

[51] Int. Cl.$^6$ ............................................. B23B 31/40
[52] U.S. Cl. ..................... 279/2.08; 279/4.03; 294/98.1; 294/119.3
[58] Field of Search ........................ 279/2.08, 4.03; 294/63.2, 98.1, 119.3

[56] References Cited

U.S. PATENT DOCUMENTS

| | | | |
|---|---|---|---|
| 3,335,569 | 8/1967 | Atherholt, Sr. | 279/2.08 |
| 3,677,559 | 7/1972 | Andre et al. | 279/4.03 |
| 3,910,098 | 10/1975 | Tailhardat | 279/2.08 |
| 4,724,595 | 2/1988 | Snyder | 279/2.08 |
| 4,811,962 | 3/1989 | Cameron, Jr. | 279/2.08 |
| 4,979,853 | 12/1990 | Field | 409/136 |
| 5,286,042 | 2/1994 | Laube | 279/133 |

FOREIGN PATENT DOCUMENTS

| | | |
|---|---|---|
| 31 16 289 | 11/1982 | Germany . |
| 38 31 138 | 4/1990 | Germany . |
| 39 09 630 | 9/1990 | Germany . |

*Primary Examiner*—Steven C. Bishop
*Attorney, Agent, or Firm*—Baker, Maxham, Jester & Meador

[57] ABSTRACT

A chucking tool for non-positive precision chucking of a part such as a workpiece or the shank of a tool, for example. The tool consists of a base body, an expansion sleeve that is detachably mounted on a part of the base body which is elastically deformable in the radial direction, and a device for introducing a hydraulic medium into a pressure space provided between the expansion sleeve and the wall of the base body. According to this invention, the expansion sleeve is made of a comparatively thick-walled thermoplastic material, at least in its radially deformable part. According to another feature of this invention, there is at least one groove-shaped hydraulic medium channel in the area of the surface pairing of the expansion sleeve and the base body and it can be acted upon by the supply of hydraulic medium, for example, with a manually operated piston-cylinder unit provided in the base body.

12 Claims, 2 Drawing Sheets

CHUCKING TOOL WITH AN EXPANSION SLEEVE

BACKGROUND OF THE INVENTION

1. Field of the Invention

The invention generally concerns a chucking tool with accurate non-positive chucking of a workpiece, and more particularly includes an axially deformable sleeve for engaging a workpiece or tool shank.

2. Description of the Related Art

Chucking tools of the type which are the subject of this invention are used for accurately centered, detachable fastening of a workpiece or tool on a spindle, for example, or a similar device, where a hydraulic fluid that causes radial expansion or shrinkage of the expansion sleeve (which is capable of elastic deformation to a limited extent) is introduced in an annular space between the expansion sleeve and the body of the tool in order to achieve the required chucking force.

German patent 3,931,138 discloses a chucking tool on whose cylindrical body sits a clamping sleeve made of titanium or a titanium alloy having a hard layer on the surface that comes in contact with the workpiece. The clamping sleeve is fixed on a ring collar of the mandrel body with a molded radial flange at the end by means of a hold-on ring. The actual chucking section of the expansion sleeve comprises an incorporated ring chamber that is sealed with respect to the mandrel body by means of ring gaskets at one end and is acted on by a hydraulic fluid through channels running through the mandrel body. The expansion sleeve has teeth with hardened tips on the outside. This design is especially expensive because of the materials used for the expansion sleeve, where the precision machining of the titanium sleeve needed for the true concentric running that is usually required is very expensive in terms of both labor and machinery.

German patent 3,909,630 discloses a chucking tool for non-positive chucking of workpieces with a high precision, where an expansion sleeve that is secured in the chucking tool sits in the workpiece to be secured so it is movable with little play in the relaxed condition of the sleeve, and after a hydraulic medium has been introduced, this yields a very accurate and secure means of fixing the workpiece on the chucking tool. To achieve a greatly increased expansion rate in comparison with traditional steel sleeves, the expansion sleeve here is made of a so-called memory alloy that is used in the austenitic state with the possibility of a reversible stress-induced change in structure to the martensitic state. The sleeve is chucked either mechanically by means of a special conical thread or hydraulically by introducing a hydraulic fluid into an annular space provided between the peripheral face of the tensioning mandrel and the inside face of the expansion sleeve. A central axial channel and radial channels branching off from it are provided in the tensioning mandrel for supplying the hydraulic fluid. This chucking tool is also expensive because of the metal alloys used.

Finally, German patent 3,116,289 discloses a tensioning mandrel with a hydraulically extensible expansion sleeve made of a fiber-reinforced plastic attached to the body of the mandrel by means of specially shaped steel rings at the end. A thin-walled sleeve into which projects the cylindrical connection of a cylinder head screwed onto one end sits in a central bore in the mandrel body with a limited length. Furthermore, the interior of this thin-walled sleeve also holds a piston whose piston rod passes through the cylinder head as well as the spindle mounted on the chucking tool and is connected to an external operating device. The working space between the piston and the cylindrical section of the cylinder head is in flow connection with an outer ring chamber formed between the cylindrical face of the tensioning mandrel and the expansion sleeve through boreholes in the mandrel body.

In practice, however, considerable drawbacks have been observed when using expansion sleeves made of fiber-reinforced plastics. To achieve acceptable concentric running performance, it is essential to machine the sleeves on the inside or outside surfaces. This process often exposes and/or cuts the reinforcing fibers that cause considerable wear by fanning out or breaking. Moreover, micro-cracks are observed after long operating times, due to the difference in the modulus of elasticity of the glass fibers used and the synthetic resin, as well as the problematical adhesion conditions prevailing in the boundary layers between the fibers and the plastics. To improve the adhesion of the break-resistant fibers embedded in the synthetic resin, additional adhesion promoters must be used. There is the danger, especially after lengthy operating times, of micro-cracks and inadequate diffusion resistance to the hydraulic medium used. Since a uniform distribution and a reliable orientation of the reinforcing fibers in the plastic material are practically impossible to achieve, stress concentrations develop and ultimately cause out-of-true running.

SUMMARY OF THE INVENTION

The object of this invention is to avoid the disadvantages of known embodiments with a chucking tool and to provide a cost-effective, non-positive precision chucking tool with an expansion sleeve which is elastically deformable in the radial direction.

The use of a certain type of creep-resistant plastic as the material of the expansion sleeve means that adhesion problems between the fibers and the synthetic resin are prevented and the concentrated stresses that occur with fiber-reinforced plastics are also avoided, thus eliminating one of the main causes of the development of micro-cracks and eccentricity. The expansion sleeves according to this invention are designed with much thicker walls in comparison with the known designs made of steel, and they can be refinished to a certain extent. In practice, this means that the user can also machine the finished mandrel or the clamping chuck to the desired chucking diameter. The expansion rate of an expansion sleeve designed according to this invention is approximately 0.5% to 2.0% which is thus considerably greater than that of sleeves made of steel or fiber-reinforced synthetic resin.

Because of its minimal creep behavior, the plastic used has a high creep rupture strength. Its moisture uptake is practically zero, which means that it has a high dimensional stability and diffusion resistance, especially with respect to the hydraulic medium. Additional important properties of the plastic material used include a good recovery in relaxation of the expansion sleeve, a high thermal stability at temperatures up to more than 100° C., good friction and wear properties, UV stability and machinability.

Of crucial importance in achieving the desired properties of the chucking tool according to this invention are the arrangement and support of the expansion sleeve in the relaxed state, such that the sleeve is pushed onto the tensioning mandrel or into the clamping chuck without any play so to speak or with an easy press fit. Then there is an automatic adjustment of the shape of the expansion sleeve to the base body formed from the tensioning mandrel or the clamping chuck, where precision machining can subsequently be performed on the relaxed expression sleeve that is secured in this way. This yields extremely good precision in running, namely 2 μm as measured on an ideal workpiece when chucked.

To assure a supply of hydraulic medium in the space between the walls of the base body and the expansion sleeve with this arrangement, a preferably spiral groove is provided along the entire length of the effective section of the expansion sleeve and is connected to a hydraulic medium channel running in the base body. This makes it possible to introduce hydraulic media into the entire gap space formed between these two walls by expanding the expansion sleeve.

Another feature of this invention is the special design whereby gripping power is produced, which can be accomplished manually from the workpiece side of the chucking tool, thus permitting reliable and highly accurate chucking of even the smallest mandrels with a diameter of less than 8 mm, for example. The bore in the tensioning mandrel used for this purpose must be only large enough to allow a rod-shaped actuating tool such as a hex-head socket wrench to be inserted, to shift the piston provided in the wider rear part of the chucking tool with a screwing motion and produce a suitably high liquid pressure in the upstream chamber. The hydraulic fluid is forced through the channels into the above-mentioned spiral groove between the base body and the expansion sleeve and causes radial expansion of the sleeve even into the areas between the flights of the groove, thus forming a continuous and approximately cylindrical hydraulic space. This type of operation offers advantages in handling and is one of the requirements of lathes in order to chuck the mandrel in chucking jaws, where workpiece feed and tightening are performed from the same side.

BRIEF DESCRIPTION OF THE DRAWING

The objects, advantages and features of this invention will be more readily perceived from the following detailed description when read in conjunction with the accompanying drawing, in which.

DETAILED DESCRIPTION OF THE PREFERRED EMBODIMENTS

Figure 1:
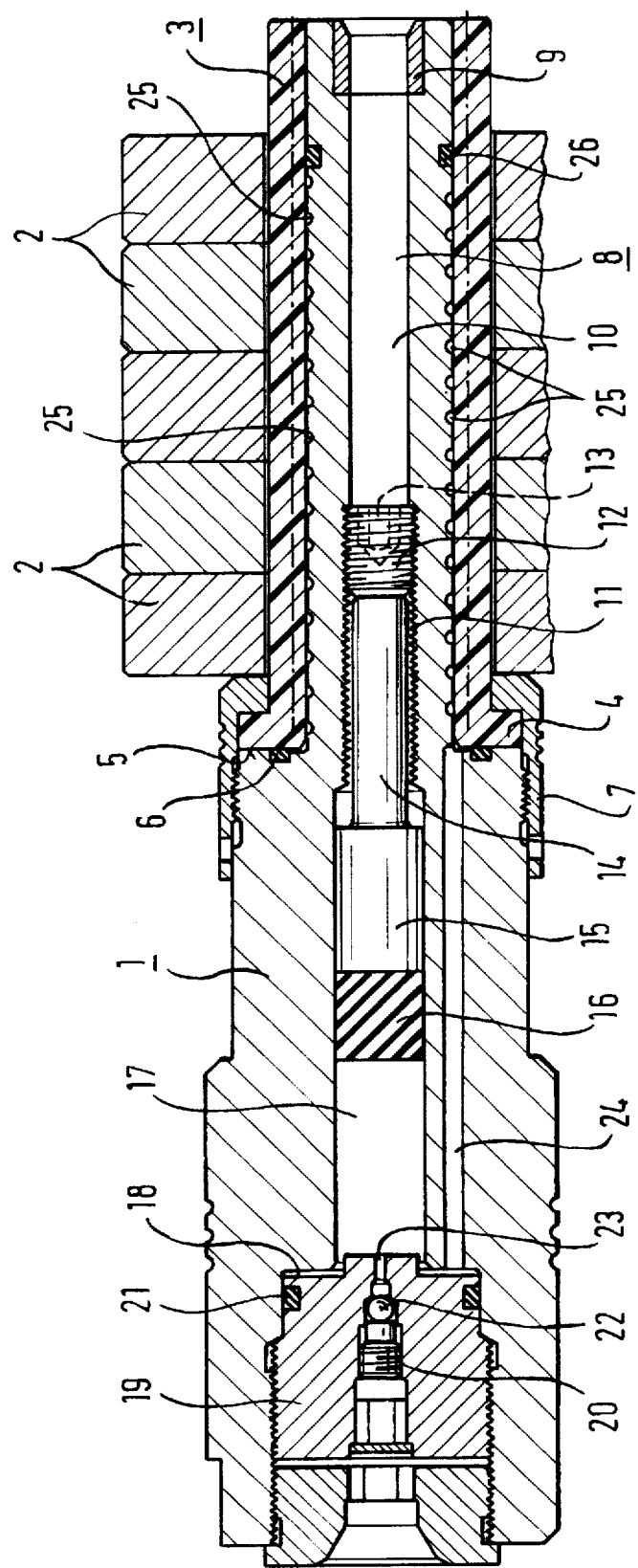
FIG. 1 is an axial section through a chucking tool designed as a tensioning mandrel in accordance with the invention.

The tensioning mandrel illustrated in FIG. 1 contains cylindrical tensioning mandrel body 1 with several shoulders, where several disk-shaped workpieces 2 are axially centered by means of expansion sleeve 3 on the narrow end section and are secured with extremely accurate concentricity. In this embodiment, expansion sleeve 3 has a constant wall thickness and is made of a special thermoplastic, especially a linear polyester such as PET, PBT and PC, or a blend thereof and a polyblend (polymer blend having a high impact strength and containing chlorinated polyethylene). At one end, expansion sleeve 3 has radial collar 4 that is supported on annular shoulder 5 of body 1, where annular gasket 6 is provided in the bearing surface. This radial collar 4 is pressed against shoulder 5 and gasket 6 by means of union nut 7 that is screwed onto the section of mandrel body 1 adjacent to shoulder 5.

A continuous central bore 8 having several shoulders is provided in mandrel body 1 and has an enlarged area at the right end in FIG. 1 to accommodate bushing 9. In smooth-walled longitudinal section 10 adjacent to bushing 9, central bore 8 has a diameter sufficient for inserting a rod-shaped hex-head wrench. This longitudinal section 10 is adjacent to threaded section 11 in which set screw 12, having an outside thread and hexagonal socket 13 to accommodate the socket wrench, is provided. Set screw 12 works together with piston rod 14 whose piston 15 is arranged in enlarged section 17 of the central bore by means of gasket arrangement 16 so it can be displaced axially. Plug 19 with central valve arrangement 20 is mounted in an end section of central bore 8 that is enlarged further, and the plug is sealed with ring gasket 21. Valve arrangement 20 contains ball valve 22 that is held in its seat axially by supporting elements that are optionally adjustable, and the ball valve blocks central counterbalance bore 23 to section 17 of central bore 8 that forms a space for the hydraulic medium.

Stopper or plug 19 is designed so as to form narrow annular space 18 between the end face and an annular shoulder on mandrel body 1, where the annular space is in flow connection first with working space 17 and secondly with axially parallel hydraulic medium channel 24 running in the mandrel body. Hydraulic medium channel 24 leads to spiral groove 25, which in the present embodiment is cut in the outside surface of the section of the mandrel body that accommodates expansion sleeve 3. At the end of spiral groove 25 there is ring gasket 26 which, together with annular gasket 6, borders the effective chucking section of expansion sleeve 3. In the relaxed state, expansion sleeve 3 sits with an easy press fit on the corresponding section of mandrel body 1, so its inside surface is in continuous pressure contact with the outside surface of this section of the mandrel body except for spiral grooves 25.

Since the plastic material of the expansion sleeve has a certain inherent stability, and in its relaxed state the expansion sleeve is secured by the large-area pressure contact and also by the fact that its radial collar 4 is clamped on the respective section of mandrel body 1, precision machining of the outside periphery of expansion sleeve 3 that has been chucked in this way is thus possible to yield a high precision in axial centering and thus excellent concentricity.

After inserting a hex-head wrench (not shown) into recess 13 in set screw 12, piston 15 can be displaced axially by turning the set screw so the liquid that has entered working space 17 is forced through annular gap 18 into axially parallel channel 24 and out of this into spiral groove 25. Thus there is a uniform radial widening of expansion sleeve 3, forming a narrow elongated annular space between the inside wall of expansion sleeve 3 and the outside wall of the section of mandrel body 1 which contains spiral grooves 25.

Figure 2:
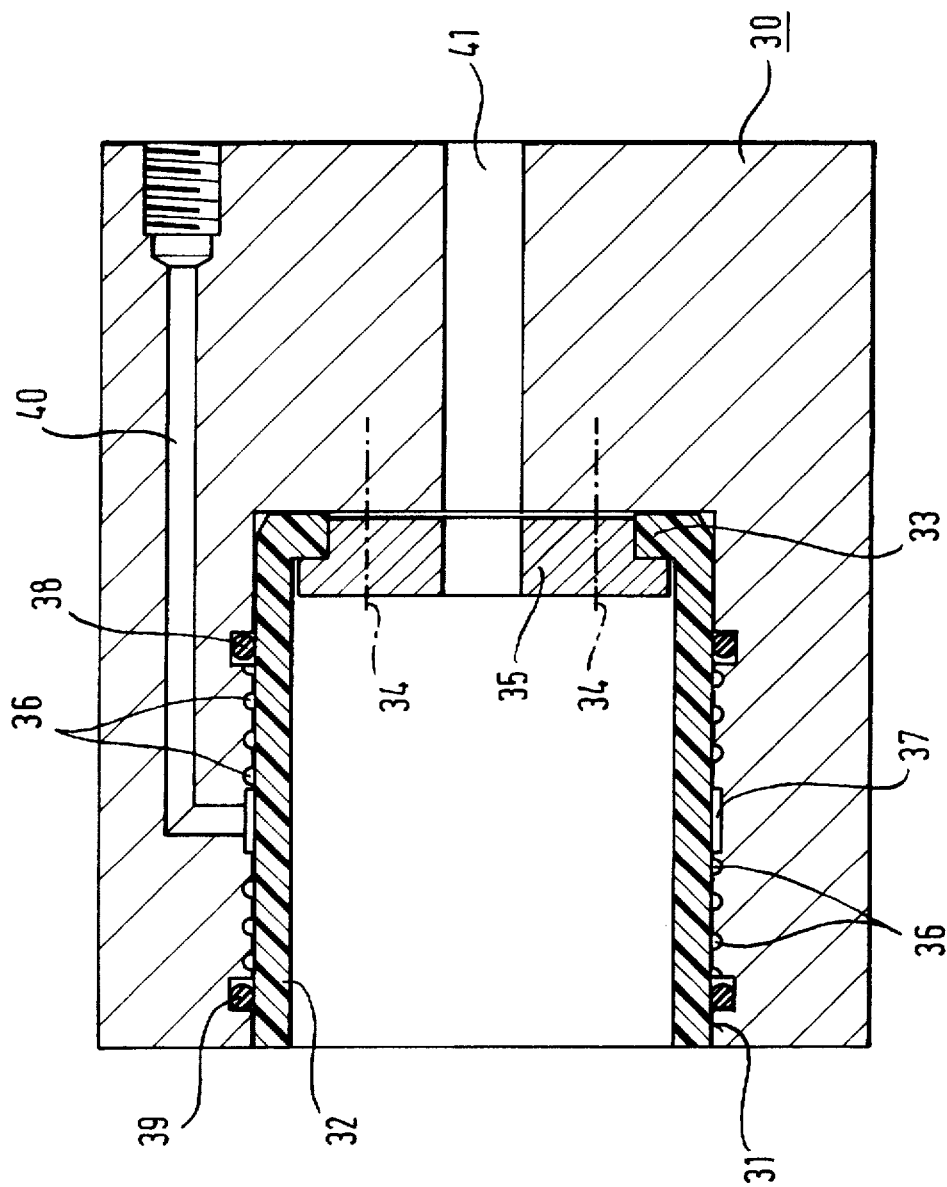
FIG. 2 is an axial section through a chucking tool designed as a clamping chuck in accordance with the invention.

With the clamping chuck illustrated in FIG. 2, cylindrical base body 30 has cylindrical recess 31 which is open at the end and accommodates expansion or clamping sleeve 32 according to this invention with an easy press fit, so the outside wall of expansion sleeve 32 is in light pressure contact with the inside wall of recess 31. Expansion sleeve 32 has collar 33 projecting radially inwardly at one end to serve as an abutment for pressure element 35 which is detachably attached to the end of recess 31 by screws 34 in base body 30. Expansion sleeve 32 is preferably made of the same material as expansion sleeve 3 in the embodiment according to FIG. 1. Spiral grooves 36 are provided in the wall surrounding recess 31 and are in flow connection with central annular space 37. The longitudinal section containing grooves 36 is bordered by two ring gaskets 38 and 39. Annular space 37 is connected to an external supply of hydraulic medium (not shown) through a hydraulic medium channel 40 running in base body 30. Furthermore, central bore 41 is provided in base body 30 and in pressure part 35.

The function of the clamping chuck illustrated in FIG. 2 corresponds to that of the tensioning mandrel according to FIG. 1, where the clamping chuck is used as intended to secure a cylindrical part inserted into recess 31.

The invention is not limited to the embodiments and details described above. For example, instead of spiral grooves 25 and 36, axial grooves and/or ring grooves may also be provided. In addition, ring gaskets 6, 26 and 38, 39 illustrated here may be omitted under some circumstances if the end parts of the expansion sleeve are reinforced and tightened on the corresponding sections of base body 1 or 30 by means of a stronger shrink fit. In addition, grooves 25, 36 may also be designed in the wall of the expansion sleeve instead of in the chucking tool body. If the base body is made of a relatively softer material, such as aluminum or an aluminum alloy, then suitable centering inserts can be used for accurate fixation of the expansion sleeve.

It is of special practical importance that the plastic expansion sleeves according to this invention are inexpensive items with a simple design which can be replaced quickly and cheaply as needed. Since the wall thickness of the plastic expansion sleeves according to this invention is much greater, specifically up to eight times greater, than that of traditional expansion sleeves made of steel, titanium or a memory alloy, and since their expansion rate is much greater than that of known expansion sleeve designs, it is possible for the user to remachine an expansion sleeve that shows some signs of wear. In addition, the expansion sleeve according to this invention may also have a non-circular cross section, where the effective clamping surface is adapted to the inside or outside peripheral surface of the object to be clamped.

What is claimed is:

1. A chucking tool for precise non-positive chucking of a part such as a workpiece or a tool shank, said chucking tool comprising:

a base body having an operative wall;

a machineable expansion sleeve detachably mounted to part of said base body, said expansion sleeve having an operative portion which is elastically deformable in the radial direction;

axially spaced sealing means providing a pressure space between said operative portion of said expansion sleeve and said operative wall of said base body; and means for introducing a hydraulic medium into said pressure space and draining it out;

said expansion sleeve being made of a thick-walled thermoplastic material having a high creep-rupture strength, said expansion sleeve material capable of being machined to a desired diameter after being affixed on said base body.

2. The chucking tool recited in claim 1, wherein said expansion sleeve is formed with radial end sections formed with greater inherent stability than said radially deformable portion, said expansion sleeve being mounted on the respective operative wall of said base body with a pressure-tight press fit.

3. The chucking tool recited in claim 1, wherein said expansion sleeve has at least one radial collar for detachable mounting on said base body.

4. The chucking tool recited in claim 2, wherein said expansion sleeve has at least one radial collar for detachable mounting on said base body.

5. The chucking tool recited in claim 1, wherein said means for introducing a hydraulic medium comprises groove-like hydraulic medium channels provided between said operative portion of said expansion sleeve and said operative wall of said base body, said channels being in flow connection with said means for introducing a hydraulic medium through channels running through said base body.

6. The chucking tool recited in claim 5, wherein said groove-like hydraulic medium channels are configured in the form of spiral grooves.

7. The chucking tool recited in claim 1, wherein said base body has a piston-cylinder unit arranged centrally therein that forms a tensioning mandrel, said piston being displaceable manually by means of control elements, the working space of said piston-cylinder unit being in flow connection with said pressure space through an annular chamber at one end thereof and an axially parallel channel running in said base body.

8. The chucking tool recited in claim 7, wherein said piston is configured with a seal in an enlarged central bore in said base body and is in operative connection by means of a piston rod with a set screw engaged in a threaded section of said central bore, said piston and said set screw being axially adjustable by rotation thereof.

9. The chucking tool recited in claim 7, and further comprising a valve arrangement arranged in one end of said base body for introducing the hydraulic medium into the working space and draining it out.

10. The chucking tool recited in claim 8, and further comprising a valve arrangement arranged in one end of said base body for introducing the hydraulic medium into the working space and draining it out.

11. A chucking tool for precise non-positive chucking of a part such as a workpiece or a tool shank, said chucking tool comprising:

a base body having an operative wall;

an expansion sleeve detachably mounted to part of said base body, said expansion sleeve having an operative portion which is elastically deformable in the radial direction;

axially spaced sealing means providing a pressure space between said operative portion of said expansion sleeve and said operative wall of said base body; and means for introducing a hydraulic medium into said pressure space and draining it out;

said expansion sleeve being made of a thick-walled, creep-resistant thermoplastic material, at least in its radially deformable operative portion, and formed with radial end sections having greater inherent stability than said radially deformable portion, said expansion sleeve being mounted on the respective operative wall of said base body with a pressure-tight press fit.

12. The chucking tool recited in claim 11, wherein said expansion sleeve has at least one radial collar for detachable mounting on said base body.

* * * * *